(12) United States Patent
Yokoyama et al.

(10) Patent No.: US 9,334,977 B2
(45) Date of Patent: May 10, 2016

(54) ENGINE VALVE (71) Applicant: NITTAN VALVE CO., LTD., Kanagawa (JP)

(72) Inventors: Hisanaga Yokoyama, Kanagawa (JP); Masanami Iio, Kanagawa (JP)

(73) Assignee: NITTAN VALVE CO., LTD., Kanagawa (JP)

( * ) Notice: Subject to any disclaimer, the term of this patent is extended or adjusted under 35 U.S.C. 154(b) by 0 days.

(21) Appl. No.: 14/439,149

(22) PCT Filed: Oct. 30, 2012

(86) PCT No.: PCT/JP2012/077998
§ 371 (c)(1),
(2) Date: Apr. 28, 2015

(87) PCT Pub. No.: WO2014/068662
PCT Pub. Date: May 8, 2014

(65) Prior Publication Data
US 2015/0292640 A1    Oct. 15, 2015

(51) Int. Cl.
*C22C 19/05* (2006.01)
*C23C 8/48* (2006.01)
(Continued)

(52) U.S. Cl.
CPC ............... *F16K 25/005* (2013.01); *C23C 8/24* (2013.01); *C23C 8/28* (2013.01); *C23C 8/36* (2013.01); *C23C 8/48* (2013.01); *C23C 8/56* (2013.01);
(Continued)

(58) Field of Classification Search
CPC .............. C23C 8/48; C23C 8/50; C23C 8/54; C23C 8/56; C23C 8/74; C23C 8/76
See application file for complete search history.

(56) References Cited

FOREIGN PATENT DOCUMENTS

| JP | 55134172 A | 10/1980 |
| JP | 07102916 | 4/1995 |

(Continued)

OTHER PUBLICATIONS

English Abstract of Kakuwa et al. (JP 55-134172) (Oct. 18, 1980).*
(Continued)

*Primary Examiner* — Jessee Roe
(74) *Attorney, Agent, or Firm* — Fulwider Patton LLP

(57) ABSTRACT

[Problem] To provide an engine valve which satisfies predetermined characteristics with respect to impact resistance, abrasion resistance and high-temperature corrosion resistance all of which meet or exceed predetermined levels required to resist severe use environments, while also minimizing the content ratios of predetermined rare metals.

[Means for Solving the Problem] An engine valve is configured to include an engine valve base body having a stem portion and a head portion provided at one end portion of the stem portion, which engine valve comprises: a build-up portion formed by seat welding to encircle the head portion; and a seat obtained by forming a surface-hardened layer on the build-up portion, wherein the build-up portion is formed of a seat weld material constituted of a Ni—Fe—Cr alloy containing W at 8.0 to 40.0 mass %, Mo at a total together with W in a range of 20.0 to 40.0 mass %, Fe at 20.0 to 50.0 mass %, Cr at 12.0 to 36.0 mass %, B at 1.0 to 2.5 mass %, and a balance of Ni and inevitable impurities, and wherein the surface-hardened layer is formed by effecting nitriding treatment on the entire valve to form a nitride layer on a machined surface formed on the seat, thereby ensuring predetermined characteristic while minimizing rare metal content ratio.

2 Claims, 7 Drawing Sheets (a)

(b)

(51) Int. Cl.
  *F16K 25/00* (2006.01)
  *F01L 3/04* (2006.01)
  *C23C 8/24* (2006.01)
  *C23C 8/28* (2006.01)
  *C23C 8/36* (2006.01)
  *C23C 8/56* (2006.01)
  *F01L 3/02* (2006.01)

(52) U.S. Cl.
  CPC ... *F01L 3/02* (2013.01); *F01L 3/04* (2013.01); *F01L 2101/00* (2013.01); *F01L 2103/00* (2013.01); *F01L 2800/18* (2013.01); *F01L 2820/01* (2013.01)

(56) References Cited

FOREIGN PATENT DOCUMENTS

| | | |
|---|---|---|
| JP | 11006407 A | 1/1999 |
| JP | 1107720 A | 4/1999 |
| JP | 2001050020 A | 2/2001 |
| WO | 2012063512 A1 | 5/2012 |
| WO | 2014068662 A1 | 5/2014 |

OTHER PUBLICATIONS

International Search Report, PCT/JP2012/-77998, Jan. 29, 2013.

\* cited by examiner

ENGINE VALVE

CROSS-REFERENCES TO RELATED APPLICATIONS

This application is a national stage application based on International Application No. PCT/JP2012/077998 filed Oct. 30, 2012.

FIELD OF THE INVENTION

The present invention relates to an engine valve with a seat formed of a seat weld metal.

BACKGROUND OF THE INVENTION

In a dry combustion environment where natural gas or the like is combusted, since combustion residuals do not readily form on the surface of an engine valve, direct metal-metal contact occurs between a valve seat surface and a seat insert, so that the valve seat suffers severe adhesive wearing. In this connection, Tribaloy T400 (Registered Trademark), a cobalt base abrasion resistance alloy, has been used in natural gas and other such environments where severe abrasion occurs. However, since material cost is high and workability is poor in the case of using the cobalt base abrasion resistance alloy, this is fatal flaw in manufacturing a valve.

Various proposals have been made for reducing the cost of engine valves that have high durability in a dry combustion environment. In particular, Patent Publication #1 indicated below proposes to form a surface-hardened layer by effecting nitriding treatment on a seat weld metal of an iron-base alloy of a specified composition, thereby increasing the durability of an engine valve at a low cost.

PRIOR ART PUBLICATION

Patent Publication

Patent Publication 1

Japanese Patent Application Laid Open No. Hei 7-102916

SUMMARY OF THE INVENTION

Problems to be Solved by the Invention

However, rising concern about the environment has in recent years led to the imposition of various limitations on the use environment of industrial equipment. Along with this trend, a need has come to be felt for further improvement of hard-facing alloy performance and the development of an inexpensive alloy that enables effective utilization of mineral resources and reduced use of rare metal. In particular, it is necessary to develop a seat weld alloy for use in an engine valve that has good impact resistance, good abrasion resistance and good high-temperature corrosion resistance, and can utilize an inexpensive alloy using abundantly available resources.

It is an object of the present invention to provide an engine valve which achieves impact resistance, abrasion resistance and high-temperature corrosion resistance all of which meet or exceed predetermined levels required to resist severe environments, while also minimizing the content ratios of predetermined rare metals.

Means for Solving the Problems

An invention defined in Claim 1 is characterized by an engine valve including an engine valve base body having a stem portion and a head portion provided at one end portion of the stem portion, which engine valve comprises: a build-up portion formed by seat welding to encircle the head portion; and a seat obtained by forming a surface-hardened layer on the build-up portion, wherein the build-up portion is formed of a seat weld material constituted of a Ni—Fe—Cr alloy containing W at 8.0 to 40.0 mass %, Mo at a total together with W in a range of 20.0 to 40.0 mass %, Fe at 20.0 to 50.0 mass %, Cr at 12.0 to 36.0 mass %, B at 1.0 to 2.5 mass %, and a balance of Ni and inevitable impurities, and wherein the surface-hardened layer is formed by effecting nitriding treatment on the entire valve to form a nitride layer on a machine-finished surface formed on the seat.

The invention defined in Claim 2 is characterized in that in the configuration of the invention defined in Claim 1, elements incorporated within a range of remaining elements contained in the seat weld material comprise 15.0 mass % or less of elements selected from among Co, Mn, Cu and Si, 15.0 mass % or less of Co, 5.0 mass % or less of Mn, 5.0 mass % or less of Cu, 2.0 mass % or less of Si and 0.5 mass % or less of C.

Technical Advantages of the Invention

According to the invention defined in Claim 1, since the nitride layer formed as the surface-hardened layer on the machine-finished seat of the seat weld material satisfying four prescribed properties is formed by effecting nitriding treatment on the entire valve, it is possible to manufacture an engine valve having a required durability without particular increase in manufacturing steps, while minimizing the content of certain hard-to-obtain rare metals.

According to the invention defined in Claim 2, in addition to the technical advantage of the invention defined in Claim 1, the content of additional elements which do not have a negative impact on the physical property is suppressed equal to or lower than the predetermined upper limit so that it is possible to prevent decrease in impact resistance and abrasion resistance of the alloy according to the present invention.

DESCRIPTION OF THE PREFERRED EMBODIMENTS

A preferred embodiment of the present invention concretely configured based on the above described technical idea will be described below.

(Configuration)

Figure 1:
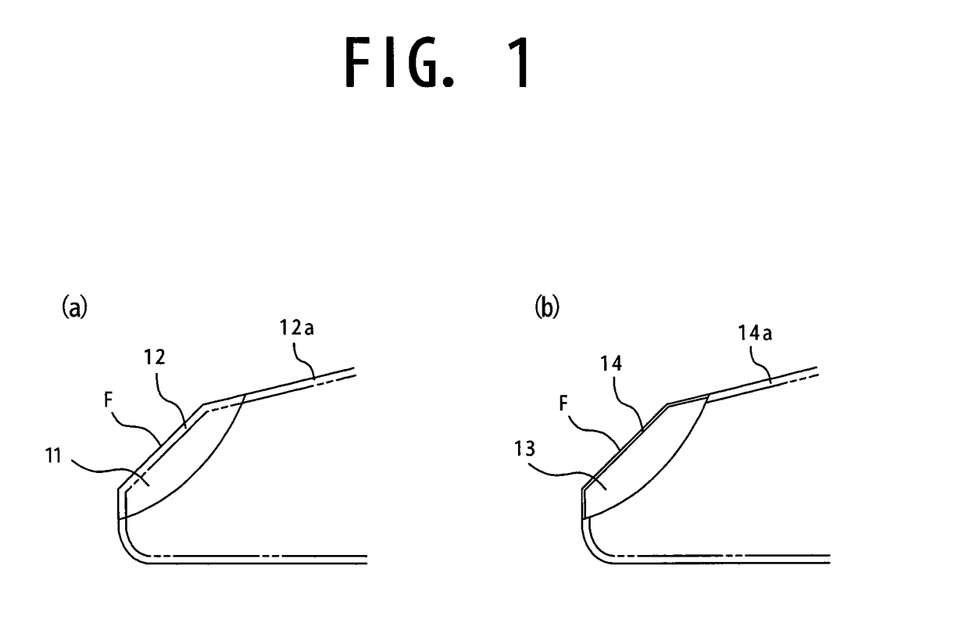
FIG. 1 is a cross sectional view of an engine valve in the vicinity of a seat.

As shown FIG. 1 which is a cross sectional view of an engine valve, with regard to an engine valve according to the present invention, in a first case (a) where an iron-base alloy is used as a seat weld metal 11, an iron-base abrasion-resistant alloy having a predetermined composition specified below is used as the seat weld metal 11 and the entire valve is subjected to a nitriding treatment after machine processing of the seat surface F, thereby forming a surface-hardened layer 12 consisting of a nitride layer on the seat weld metal 11 and forming a nitride layer 12a on the remainder of the valve surface. Further, in a second case (b) where a cobalt-base alloy is used as a seat weld metal 13, a commonly-used cobalt-base abrasion-resistant alloy is used as the seat weld metal 13 and the entire valve is subjected to a nitriding treatment after machine processing of the seat surface F, thereby forming a surface-hardened layer 14 consisting of an oxide layer containing sporadic nitride layers on the seat weld metal 13 and forming a nitride layer 14a on the remainder of valve surface.

In the engine valves configured as described above, the surface-hardened layer 12 formed on the seat F of the seat weld metal 11 by the nitriding treatment together with the nitride layer 12a in case (a) and the surface-hardened layer 14 formed on the seat F of the seat weld metal 13 by the nitriding treatment together with the nitride layer 14a in case (b) can prevent occurrence of direct metal-to-metal contact between the seat surface of the engine valve and the valve seat and can ensure abrasion resistance of the seat in cooperation with a stem portion of the valve.

(Manufacturing Process)

Figure 2:
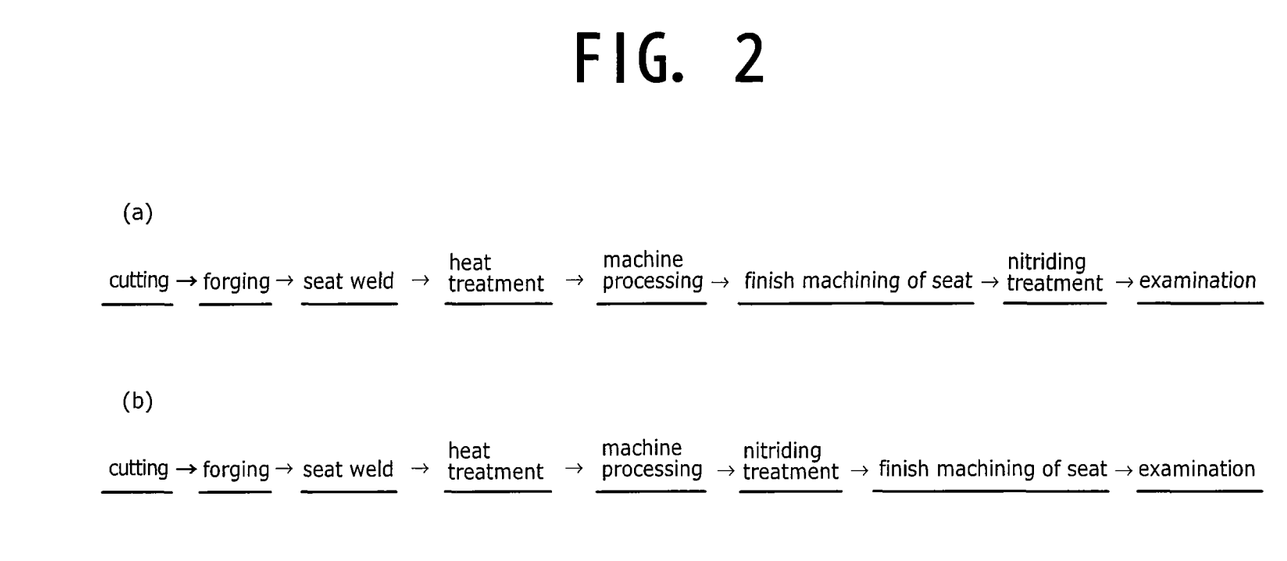
FIG. 2 is a set of diagrams (a) and (b) for comparing a new step for manufacturing an engine valve and a conventional step for manufacturing an engine valve.

As shown in the diagrams of FIG. 2 comparing new and conventional steps for manufacturing an engine valve, when the engine valve is to be manufactured, the entire valve is subjected to nitriding treatment after the machine processing of the seat surface (process a). Two steps in the conventional process (b), namely the nitriding treatment for preventing abrasion of the sliding stem portion and the machine processing of the seat, are transposed in the process (a), so that the engine valve can be manufactured simply by transposing these steps without additional cost.

The valve material may be a martensitic steel, austenitic heat resisting steel or Ni-based superalloy. An iron-base seat weld metal or cobalt-base seat weld metal is welded on the seat surface of the exhaust valve formed by forging and the valve seat surface is subjected to rough machining and polishing so as to finish the valve seat surface.

Next, the entire valve is subjected to nitriding treatment. For example, the entire valve is subjected to salt-bath soft nitriding, specifically to nitriding in a mixed salt bath containing sodium cyanate or potassium cyanate, to form a nitride layer of intermetallic compound on the surface of a seat weld metal of iron-base alloy or form an oxide layer containing sporadic nitride layers on a seat weld metal of cobalt-base alloy. Alternatively, gas soft-nitriding, plasma nitriding or the like can be used.

(Abrasion Resistance)

Figure 3:
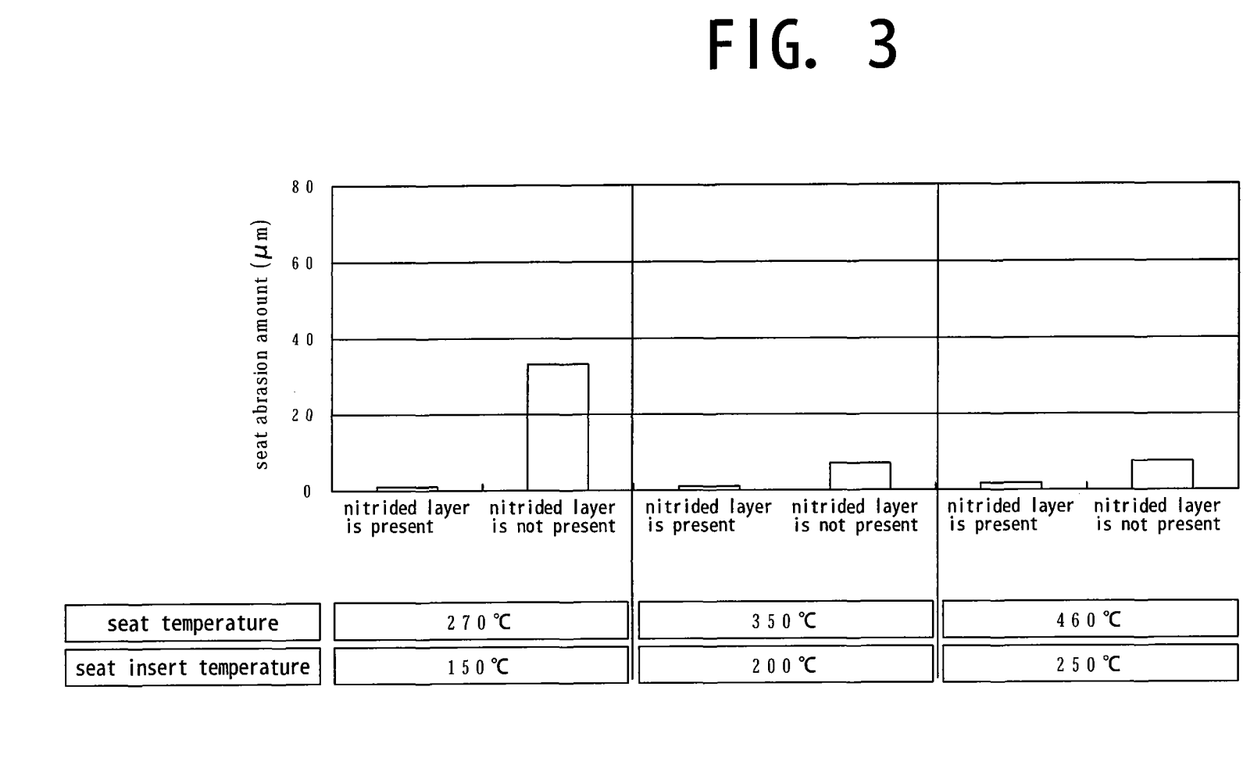
FIG. 3 is a graph for comparing amounts of abrasion of a seat between the case where a nitride layer of Fe-base seat weld metal was present and the case where a nitride layer of Fe-base seat weld metal was not present.

In the case of a seat weld metal of iron-base alloy, nitride layers were formed by nitriding at temperatures in the range of 270° C. to 460° C. and a test rig was used to compare abrasion amounts between specimens with and without the nitrided layer, with the result shown in FIG. 3. It was found that the seat had abrasion resistance. Therefore, as regards the iron-base seat weld metal, high workability can be ensured, rare metal content can be minimized and increase in the number of steps can be avoided, so that high abrasion resistance can be realized using a nitride layer without any increase in cost. Testing conditions of the rig test were as follows, wherein [^] is an exponent notation.

(1) Cam Rotation Speed: 3000 rpm, (2) Valve Rotation Speed: 20 rpm, (3) Number of Contacts: $1.6 \times 10^{\wedge}6$, (4) Number of Specimens: two per temperature.

Figure 4:
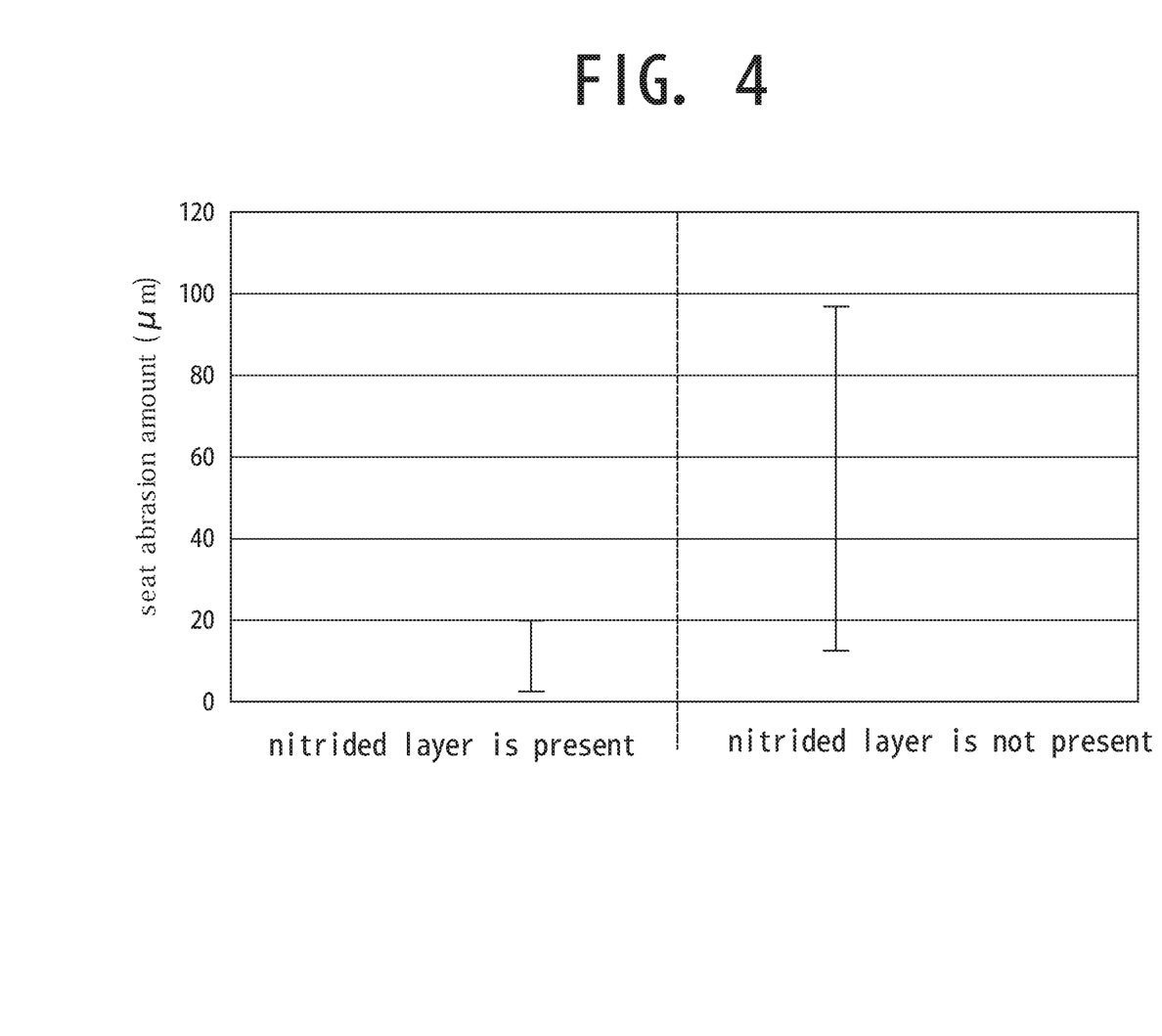
FIG. 4 is a graph for comparing amounts of abrasion of a seat between the case where a nitride layer of Co-base seat weld metal was present and the case where a nitride layer of Co-base seat weld metal was not present.

In the case of a seat weld metal of cobalt-base alloy, fixed-time tests were conducted using an actual engine to compare seat abrasion amounts between specimens with and without the nitride layer, with the results shown in FIG. 4. As FIG. 4 shows, the direct metal-to-metal contact was prevented by an oxide layer containing sporadic nitride layers and it was found that the nitriding was preferable for suppressing seat abrasion. It was confirmed from componential analysis of a cross-section that the sporadic nitride layers corresponded to the distribution of iron on the seat surface.

(Hardness at High Temperature)

Figure 5:
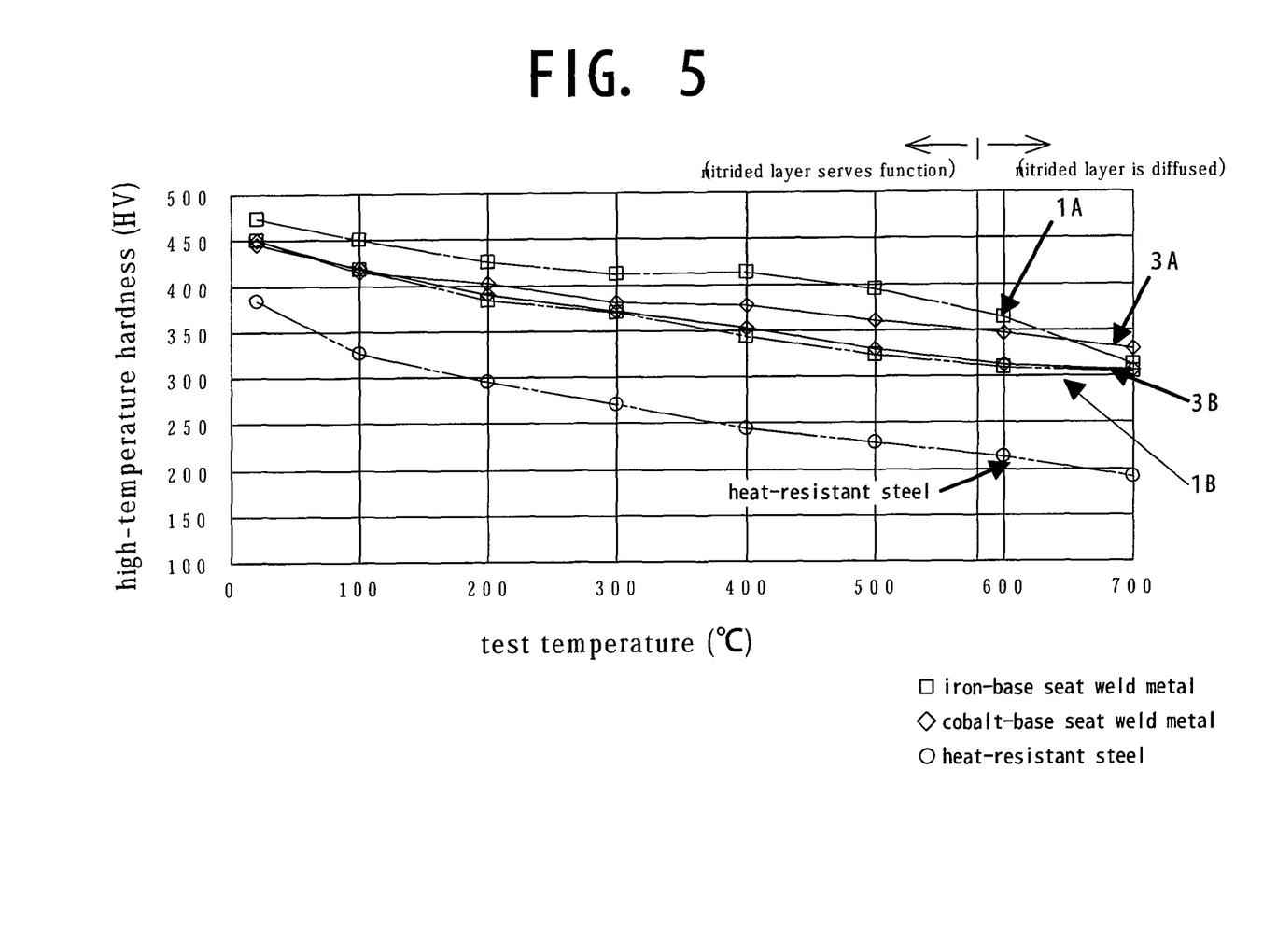
FIG. 5 is a graph for comparing high temperature hardness of seat weld metals.

The influence of the nitriding treatment of the seat weld metal on high-temperature hardness was examined and the results are shown in FIG. 5 in the form of comparative graphs. As shown in FIG. 5, in the case where the seat temperature during engine operation was a nitride layer diffusion temperature (about 600° C.), the nitriding treatment of the seat weld metal ensured considerable high-temperature hardness of the iron-base seat weld metal 1A, 1B (indicated by squares) and the cobalt-base alloy (indicated by diamonds) relative to a heat-resistant steel such as SUH35 or the like (indicated by circles). Therefore, the alloy resulting from the nitriding treatment of the seat weld metal can be expected to have better abrasion resistance than that solely by the nitriding treatment with no seat weld metal present. The component fractions of the iron-base seat weld metal 1A, the iron-base seat weld metal 1B, the cobalt-base alloy 3A, the cobalt-base alloy 3B and the heat-resistant steel are shown in Table 1.

TABLE 1

| Kind of material | composition | | | | | | | | |
|---|---|---|---|---|---|---|---|---|---|
| cobalt-base seat weld metal A | C | Si | Mn | W | Co | Cr | Ni | Mo | Fe |
| | 1.7 | 1.1 | — | 12 | Bal. | 25.5 | 22.5 | — | 1 |
| cobalt-base seat weld metal B | C | Si | Mn | W | Co | Cr | Ni | Mo | Fe |
| | 1.2 | 1.1 | — | 4.5 | Bal. | 28 | — | — | 1 |
| iron-base seat weld metal A | C | Si | B | W | Co | Cr | Ni | Mo | Fe |
| (newly developed alloy) | ≤0.5 | ≤2.0 | 1.0-2.5 | 8.0-40.0 | ≤15 | 12.0-36.0 | Bal. | 0-20.0 | 20.0-50.0 |
| iron-base seat weld metal B | C | Si | Mn | P | S | Ni | Cr | Mo | Fe |
| | 2.3 | 1.1 | — | — | — | 11 | 24 | 5.5 | Bal. |
| heat-resistant steel | C | Si | Mn | P | S | Ni | Cr | N | Fe |
| | 0.53 | — | 9 | — | — | 4 | 21 | 0.4 | Bal. |

(Iron-Base Seat Weld Metal)

The iron-base seat weld metal applicable to the engine valve according to the present invention will be described in detail below.

The following iron-base alloy (hereinafter also referred to as an "alloy of the present invention") was developed as an Ni—Fe—Cr alloy which can realize characteristic values necessary for durability of a seat based on four requirements indispensable for achieving a hard-facing alloy exhibiting impact resistance, abrasion resistance and high-temperature corrosion resistance, and which also enables minimization of rare content.

Target values set as the requirements are as follows. Hereinafter, "square centimeter" is denoted as "cm2".

Charpy impact value: equal to or larger than 4 J/cm2
Rockwell hardness (C scale): equal to or larger than 42
Abrasion loss: equal to or smaller than 150 μm
Fe content: equal to or larger than 20 mass %

Here, rare metals are defined as metals other than iron, aluminum, copper, zinc, tin, gold, silver, mercury, lead, silicon, carbon, and the metal elements Ni, Cr, B, Mo, W, Mn and Co of the present invention.

An Ni—Fe—Cr alloy of the present invention is characterized by containing 0 to 20 mass % of Mo, and 8.0 to 40.0 mass % of W, at a total of Mo and W of 20.0 to 40.0 mass %, 20.0 to 50.0 mass % of Fe, 12.0 to 36.0 mass % of Cr, 1.0 to 2.5 mass % of B, and a balance of Ni and inevitable impurities. Here, the inevitable impurities are matter not intentionally added but inevitably entrained at steps of manufacturing the respective raw materials and illustrative examples include Mg, S, O, N, V, Zr, Sn and the like. The total of the inevitable impurities is normally equal to or smaller than 0.3 mass %, a level that does not impair the effect of the present invention.

Further, the alloy of the present invention may be an Ni—Fe—Cr alloy characterized by containing 15.0 mass % or less of elements selected from a group consisting of Co, Mn, Cu, Si and C, at a content of Co of 15.0 mass % or less, of Mn of 5.0 mass % or less, of Cu of 5.0 mass % or less, of Si of 2 mass % or less and of C of 0.5 mass % or less.

(Specification of Component Ratios)

The above described component ratios were specified based on experimental results from a working example as follows.

W and Mo were soluted in Ni serving as a substrate (matrix) or in Fe solid solution, thereby improving abrasion resistance and impact resistance of the alloy, and a part of the W and Mo formed intermetallic compounds together with B to further improve abrasion resistance. However, in the case where the total content of W and Mo was less than 20 mass %, no intermetallic compound sufficiently crystalized out, while in the case where the total content of W and Mo was more than 40.0 mass %, too much intermetallic compound crystalized out to considerably lower toughness (impact resistance). Therefore, the total amount of W and Mo is specified to be 20.0 to 40.0 mass %. Further, since no intermetallic compound sufficiently crystalized out in the case where the content of W was less than 8.0 mass %, the content of W is preferably 8.0 to 40 mass %, and since the solubility limit into the substrate of Mo is less than that of W, the upper limit of the content of Mo is specified to be 20.0 mass %. In addition, since Mo is an optional constituent, the content of Mo may be zero.

Fe is an abundant and inexpensive element that contributes to price reduction of the product. Therefore, the content of Fe is preferably as great as possible and the lower limit of the content of Fe is therefore specified to be 20.0 mass %. On the other hand, Fe soluted into Ni solid solution but the impact resistance, hardness and high-temperature corrosion resistance of the product were lowered when the content of Fe exceeded 50.0 mass %, so the content of Fe is therefore specified to be 20.0 to 50.0 mass %.

Cr soluted into Ni solid solution or Fe solid solution and imparts abrasion resistance, impact resistance, corrosion resistance and oxidation resistance to the product. Further, since a part of the Cr formed an intermetallic compound together with B and diffused into the matrix, Cr further improved the abrasion resistance. However, Cr did not sufficiently improve the abrasion resistance, corrosion resistance and oxidation resistance of the product when the content of Cr was less than 12 mass %, while in the case where the content of Cr exceeded 36.0 mass %, excessive formation of intermetallic compound in the metal texture, lowered the toughness of the product, so the content of Cr is specified to be 12.0 to 36.0 mass %.

B formed intermetallic compounds together with W, Mo and Cr, thus contributing to the abrasion resistance of the product. Further, B cleaned up the molten metal and improved metal flow during seat welding. Thus, B improved the workability of a PTA (Plasma Transferred Arc) build-up, a TIG (Tungsten Inert Gas) build-up, a thermal spraying or the like. However, in the case where the content of B was less than 1.0 mass %, a sufficient amount of intermetallic compounds could not be formed, so that abrasion resistance declined and the molten metal could not be sufficiently cleaned up. On the other hand, in the case where the content of B exceeded 2.5 mass %, excessive formation of intermetallic compounds considerably lowered toughness (impact resistance). Thus, the content of B is specified to be 1.0 to 2.5 mass %.

The alloy of the present invention can contain 15.0 mass % or less of Co, 5 mass % or less of Mn, 5 mass % or less of Cu, 2.0 mass % or less of Si and 0.5 mass % or less of C as additive elements which do not negatively affect physical properties of the product, but the upper limit of total amount of Co, Mn, Cu, Si and C is specified to be equal to or less than 15.0 mass % so as not to impair impact resistance and the abrasion resistance.

(Technical Advantages)

In the alloy of the present invention, the used amount of rare metals can be lowered by adding 20 mass % or more of Fe. The alloy of the present invention has a Charpy impact value of 4 J/cm2 or more and a hardness (HRC) of 42 or more. Further, in a valve seat and valve seat insert abrasion test explained later, the alloy of the present invention, incurred a total amount of engine valve seat and valve seat insert abrasion loss of less than 150 μm. Therefore, the alloy of the present invention is not only applicable to an engine valve but also widely applicable in other fields as a hard-facing alloy having high impact resistance and high abrasion resistance.

As described above, since the alloy of the present invention has a high impact resistance and high abrasion resistance as a hard-facing alloy, it can enhance the durability of an engine valve seat weld with the alloy. Further, since the alloy of the present invention contains 20 mass % of more of Fe, which is an abundant and relatively inexpensive element, it is possible to lower the used amount of rare metals and manufacture an engine valve that effectively utilizes mineral resources and is friendly to the environment.

Further, application of the alloy of the present invention is not limited to a seat weld metal and it is possible to fabricate mechanical components having high abrasion resistance by combined addition thereof to sintered components produced by powder metallurgy, thereby producing hard particles.

WORKING EXAMPLES

Embodiments

The alloy of the present invention can be used as a seat weld metal by heating and melting a base metal produced by preparing and dispensing Ni as a base component, W, Mo, Fe, Cr and B as an addition constituents, and Co, Mn, C and Si added as occasion demands so that the content of each component becomes a predetermined mass % in a crucible in a melting furnace to produce a liquiform alloy and then, reducing the liquiform alloy to powder using the atomizing process or the melting and crushing process, or, casting the liquiform alloy in a predetermined mold to obtain a rod-like or plate-like alloy.

In particular, the alloy of the present invention manufactured using the atomizing process can be optimized for surface modification applications such as PTA build-up, thermal spraying or the like by adjusting its grain size to that suitable for the intended use, and the buildup welding rod manufactured using the continuous casting process can be applied for surface modification such as by build-up or the like. The abrasion resistance of the engine valve can be improved by applying a powder adjusted in grain size or the rod member to the seat surfaces of engine valves made of various materials.

Alloys of the present invention tailored and compounded as described above and comparative example alloys were melt-formed, and subjected to Charpy impact testing, Rockwell hardness testing and abrasion testing in accordance with the following methods.

(1) Charpy Impact Test 100 g metal specimens of the compositions set out below were individually heated and melted at about 1600° C. under an argon stream in an electric furnace, casted in a shell mold, and then, machined to obtain JIS Z2242:2005 test pieces (no notch). The test pieces were thereafter subjected to an impact test in compliance with JIS Z2242:2005 using a Charpy impact test machine to measure impact values.

(2) Measurement of Hardness

Each of casted pieces produced by the method of (1) was machined into a 10 mm×10 mm×20 mm piece with exposed parallel surfaces. The tops of the parallel surfaces were subjected to wet polishing using water resistant No. 240 abrasive paper and then subjected to a Rockwell hardness test in compliance with JIS Z2245:2005. Here, the hardness of the test pieces was measured on the C scale.

Figure 6:
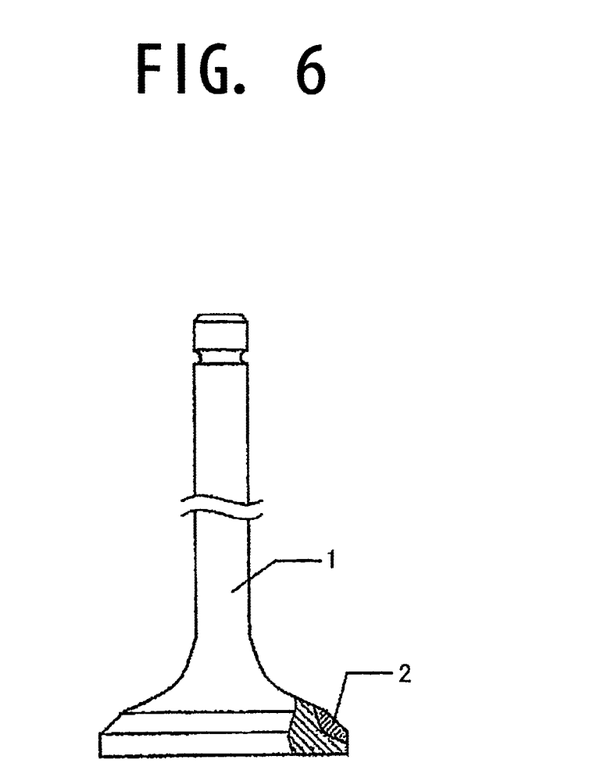
FIG. 6 is a diagram showing an engine valve.

(3) Abrasion Test 100 kg metal specimens of the compositions set out below were individually heated and melted at about 1600° C. under an argon stream in a high frequency melting furnace, atomized by a gas atomizing method, and screened to 80 to 350 mesh with a vibrating sieve. The thus obtained alloy powder was PTA seat welded on the seat surface of the engine valve 1 made of Fe—Ni—Cr heat resistant steel as shown in FIG. 6 and machined to a predetermined shape. Then, a valve seat and valve seat insert abrasion test was conducted by a test method shown in FIG. 7.

Test conditions were as follows.

Figure 7:
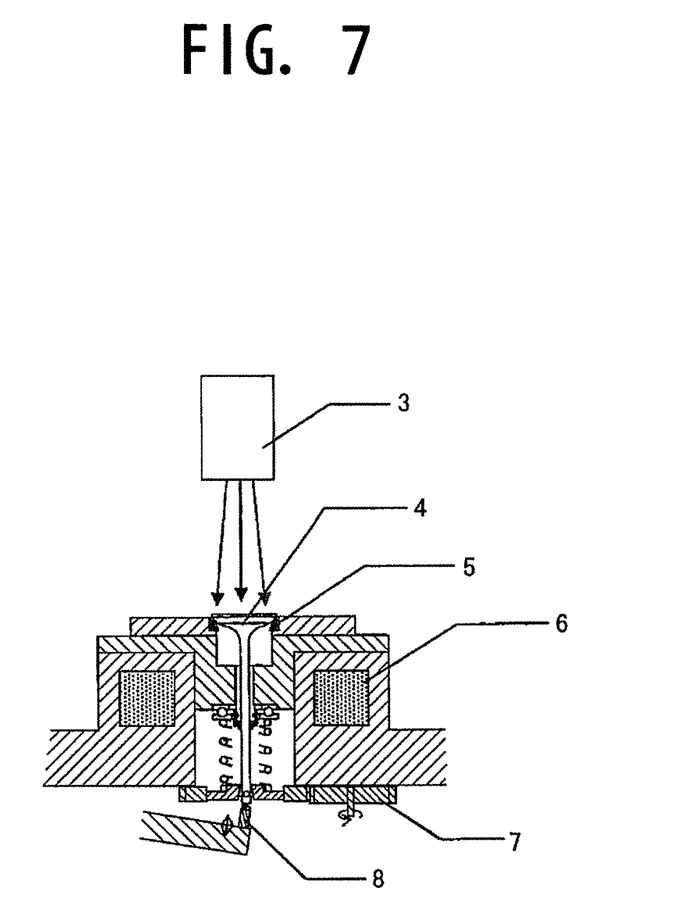
FIG. 7 is a diagram showing a valve abrasion test method.

The engine valve in the test example had a head portion of about 32 mm diameter, a stem of about 6 mm diameter and an overall length of about 110 mm. A Co—Mo—Cr sintered material was used as the valve seat insert. The rotation speed of a cam, the rotation speed of the valve and the valve seat temperature were set to be 3000 rpm, 20 rpm, and 250 to 400° C., respectively. Under these test conditions, a test was conducted for nine hours and the total abrasion loss of the valve seat and the valve seat insert was measured. Here, the reference numeral 3 designates a heating burner and the reference numerals 4, 5, 6, 7 and 8 designate a valve, seat insert, cooling water, rotator and a push rod (moving vertically), respectively.

(Evaluation Criteria)

○: Total Abrasion Loss of Valve Seat and Valve Seat Insert less than 100 μm

Δ: Total Abrasion Loss of Valve Seat and Valve Seat Insert equal to or more than 100 μm and less than 150 μm ×: Total Abrasion Loss of Valve Seat and Valve Seat Insert equal to or more than 150 μm The results of working examples are shown in Table 2 and the results of comparative examples are shown in Tables 3 and 4.

TABLE 2

| example No. | composition (mass %) | | | | | | | impact value (J/cm2) | hardness (HRC) | abrasion loss |
|---|---|---|---|---|---|---|---|---|---|---|
| | Ni | W | Mo | Fe | Cr | B | others | | | |
| 1 | 15.3 | 30 | — | 30 | 23 | 1.5 | 0.2Si | 5 | 45.8 | ○ |
| 2 | 27.9 | 10 | 12 | 28 | 20 | 2.1 | — | 4 | 46.4 | Δ |
| 3 | 13.9 | 22 | — | 28 | 34 | 1.6 | 0.5Si | 4 | 49.1 | Δ |
| 4 | 21.5 | 39 | — | 22 | 16 | 1.5 | — | 6 | 45.5 | ○ |
| 5 | 17.3 | 20 | 18 | 25 | 18 | 1.7 | — | 4 | 44.5 | ○ |
| 6 | 10.4 | 25 | — | 48 | 15 | 1.6 | — | 5 | 43.3 | Δ |
| 7 | 10.7 | 33 | — | 27 | 14 | 2.3 | 13Co | 4 | 42.5 | ○ |
| 8 | 10.4 | 25 | — | 35 | 28 | 1.2 | 0.4C | 8 | 43.4 | Δ |
| 9 | 17.5 | 25 | 5 | 2.8 | 23 | 1.5 | — | 6 | 44.5 | ○ |
| 10 | 30.9 | 10 | 15 | 25 | 16 | 1.3 | 1.8Si | 5 | 44.2 | Δ |
| 11 | 18.3 | 20 | 10 | 25 | 25 | 1.4 | 0.3C | 7 | 43.2 | ○ |
| 12 | 20.9 | 15 | 8 | 26 | 15 | 1.3 | 10Co, 3Mn, 0.8Si | 7 | 43.3 | Δ |

TABLE 3

| example No. | composition (mass %) | | | | | | | impact value (J/cm2) | hardness (HRC) | abrasion loss |
|---|---|---|---|---|---|---|---|---|---|---|
| | Ni | W | Mo | Fe | Cr | B | others | | | |
| a | 28.7 | 15 | 3 | 35 | 16 | 1.8 | 0.5Si | 7 | 38.6 | X |
| b | 12.3 | 42 | — | 25 | 18 | 2.7 | — | 3 | 48.9 | ○ |
| c | 23.4 | 10 | 22 | 25 | 16 | 1.3 | 2.3Si | 3 | 42.4 | ○ |
| d | 11.8 | 24 | 18 | 30 | 15 | 1.2 | — | 3 | 52.4 | ○ |
| e | 44.2 | 26 | — | 18 | 10 | 1.5 | 0.3C | 10 | 35.6 | X |
| f | 1.6 | 25 | 5 | 52 | 15 | 1.4 | — | 3 | 40.4 | Δ |
| g | 11.2 | 25 | — | 25 | 38 | 0.8 | — | 9 | 41.6 | X |
| h | 9.7 | 20 | 10 | 35 | 23 | 1.6 | 0.7C | 2 | 46.7 | ○ |
| i | 21.0 | 12 | 12 | 25 | 12 | 1.0 | 15Co, 2Mn | 6 | 40.1 | X |

TABLE 4

| comparative example No. | composistion (mass %) | amount of Fe (mass %) | impact value (J/cm2) | hardness (HRC) | abrasion loss |
|---|---|---|---|---|---|
| A | Co—28.5Cr—4.6W—1.2C | 0 | 14 | 43.3 | X |
| B | Co—30Cr—8.5W—1.45C | 0 | 6 | 8.4 | X |
| C | Co—29Mo—8.5Cr—2.8Si | 0 | 3 | 55.2 | ○ |
| D | Co—22Mo—17Cr—1.3Si—0.2C | 0 | 4 | 49.2 | ○ |
| E | Ni—30.2Cr—9.07Mo—3.7Si—2.61C | 0 | 3 | 40.8 | ○ |
| F | Ni—32.4Cr—9.09Mo—3.65C—2.01Si | 0 | 3 | 42.1 | ○ |
| G | Ni—32.2Cr—15Mo—2.68C—1.01Si | 0 | 3 | 46.3 | Δ |
| H | Ni—37Cr—20Co—16Fe—10Nb—1Si—0.05C | 16.0 | 1 | 55.4 | ○ |
| I | Ni—22Cr—16Fe—13Mo—6Nb—1Si—0.05C | 16.0 | 7 | 31.2 | X |
| J | Fe—45Mo—20Ni—12Mn—0.9C | 22.1 | 1 | 45.0 | ○ |
| K | Fe—21Mo—20Ni—12Mn—1.2C | 45.8 | 5 | 39.6 | Δ |
| L | Fe—33Mo—28Co—10Ni—5Mn—4Cr—1.5Si—0.3C | 18.2 | 2 | 48.1 | ○ |
| M | Fe—22.6Ni—23.4Cr—14.6Mo—2.15C—0.58Si—0.55Mn—0.3Co | 35.82 | 3 | 46.3 | X |
| N | Fe—24.5Ni—33.1Cr—5.3Mo—2.21C—10.49Mn—1Co—0.3W | 23.1 | 3 | 37.9 | X |
| O | Fe—22.7Ni—31Cr—11.8Co—11Mo—7.9W—1.29C—0.19Si—0.97Mn—0.015B | 13.135 | 2 | 48.0 | ○ |
| P | Fe—20Cr—20Ni—12Mn—8Mo—1.3C—0.2Si | 38.5 | 4 | 32.9 | X |
| Q | Fe—22Cr—21Ni—12Mn—10Mo—2C—0.2Si | 32.8 | 4 | 40.4 | X |
| R | Fe—35Cr—4Si—1C—3B | 57.0 | 2 | 55.3 | ○ |
| S | Fe—32Cr—12Ni—2.3Mn—6.2Si—1.5C | 46.0 | 1 | 58.0 | ○ |
| T | Fe—20Ni—20Cr—10Mo—12Mn—1.8C—0.2Si—0.02Al—0.005B | 35.975 | 8 | 34.5 | X |
| U | Fe—25Cr—15Ni—5Mn—5Mo—1.5C—0.8Si—0.08Al—0.08B | 47.54 | 9 | 29.7 | X |

Comparative Example 1

The alloys (a) to (i) of the comparative examples shown in Table 3 do not satisfy the requirements of the composition defined by the present invention. In the alloy (a), the total amount of Mo and W is lower than the lower limit of the total amount of Mo and W defined in the present invention and in the alloy (e), the total amount of Fe and Cr is lower than the lower limit of the total amount of Fe and Cr defined in the present invention. In the alloy (g), the amount of Cr is higher than the upper limit of the amount of Cr defined in the present invention and the amount of B is lower than the lower limit of the amount of B defined in the present invention and in the alloy (i), the total amount of Co and Mn is higher than the upper limit of the total amount of Co and Mn defined in the present invention. These alloys (a), (e), (g) and (i) do not satisfy the target values of hardness and abrasion loss. In the alloy (b), the total amount of W and B is higher than the upper limit of the total amount of W and B defined in the present invention, and in the alloy (c), the total amount of Mo and Si is higher than the upper limit of the total amount of Mo and Si defined in the present invention. In the alloy (d), the total amount of W and Mo is higher than the upper limit of the total amount of W and Mo defined in the present invention and in the alloy (h), the amount of C is higher than the upper limit of the amount of C defined in the present invention. Theses alloys (b), (c), (d) and (h) do not satisfy the target value of impact resistance. In the alloy (f), the amount of Fe is higher than the upper limit of the amount of Fe defined in the present invention. The alloy (f) does not satisfy the target values of impact resistance and hardness.

Comparative Example 2

The alloys (A) to (U) shown in Table 4 are the conventional Co—Cr—W—C alloy (Stelae (Registered Trademark)), the conventional Cr—Mo—Si alloy (Tribaloy (Registered Trademark)) or alloys disclosed in other patent publications but do not satisfy the amount of Fe and at least one of abrasion resistance, hardness and abrasion loss specified by the present invention.

To the contrary, as shown in Table 2, the alloy of the present invention according to each of working examples 1 to 12 satisfies the target values of abrasion resistance, hardness and abrasion loss and has appropriate abrasion resistance and considerable toughness.

(4) PTA Build-Up Test

In the preparatory phase of the abrasion test (3), metal flow in a molten pool during build-up welding when the engine valve was being manufactured was measured. It was found that the metal flow in each of the working examples was excellent, and the workability of the build-up was good.

(5) High Temperature Sulfidation Corrosion Test

Engine valves were manufactured using the alloys according to the working examples and the alloys (A) and (C) according to the comparative examples in the same manner as that in (3). The engine valves were immersed in sodium sulfide, maintained at 850° C. for two hours, and surface conditions of the seat weld layer were observed. It was found that sulfide was produced in the alloy (C) according to the comparative example but that no sulfide was produced in the alloys according to the working examples and the alloy (A) and each of them had an excellent high temperature sulfidation corrosion resistance.

(6) Thermal Shock Test

Engine valves were manufactured using the alloys according to the working examples and the alloys (A) and (C) according to the comparative examples in the same manner as that in (3) and after they were subjected to heat treatment in an electric furnace set at 400° C. for one hour, they were quenched in water regulated to about 20° C. They were then subjected to heat treatment for one hour at a temperature higher than the temperature in the previous heat treatment by 50° C., followed by water cooling. These operations were repeated up to a heat treatment temperature of 650° C., whereafter they were water cooled, and observed for occurrence of cracking and peel-off of the seat weld layer. Cracks were found to be present in the alloy (C) of the comparative example. To the contrary, no cracks were observed in the alloys according to the working examples or the alloy (A) of the comparative example, and it was found that these alloys had excellent thermal shock resistances.

EXPLANATION OF REFERENCE NUMERALS

11 seat weld
12 surface hardened layer (nitride layer)
15 seat

The invention claimed is:

1. An engine valve including an engine valve base body having a stem portion and a head portion provided at one end portion of the stem portion, which engine valve comprises:
   a build-up portion formed by seat welding to encircle the head portion;
   and a seat obtained by forming a surface-hardened layer on the build-up portion,
   wherein the build-up portion is formed of a seat weld material constituted of a Ni—Fe—Cr alloy containing W at 8.0 to 40.0 mass %, Mo at a total together with W in a range of 20.0 to 40.0 mass %, Fe at 20.0 to 50.0 mass %, Cr at 12.0 to 36.0 mass %, B at 1.0 to 2.5 mass %, and a balance of Ni and inevitable impurities, and
   wherein the surface-hardened layer is formed by effecting nitriding treatment on the entire valve to form a nitride layer on a machined surface formed on the seat.

2. An engine valve according to claim 1,
   wherein elements incorporated within a range of remaining elements contained in the buildup material comprise 15.0 mass % or less of elements selected from among Co, Mn, Cu and Si, 15.0 mass % or less of Co, 5.0 mass % or less of Mn, 5.0 mass % or less of Cu, 2.0 mass % or less of Si and 0.5 mass % or less of C.

\* \* \* \* \*